March 18, 1941.  W. H. HILL ET AL  2,235,747
PRODUCTION OF AMMONIUM DITHIOCARBAMATE
Filed Aug. 25, 1939
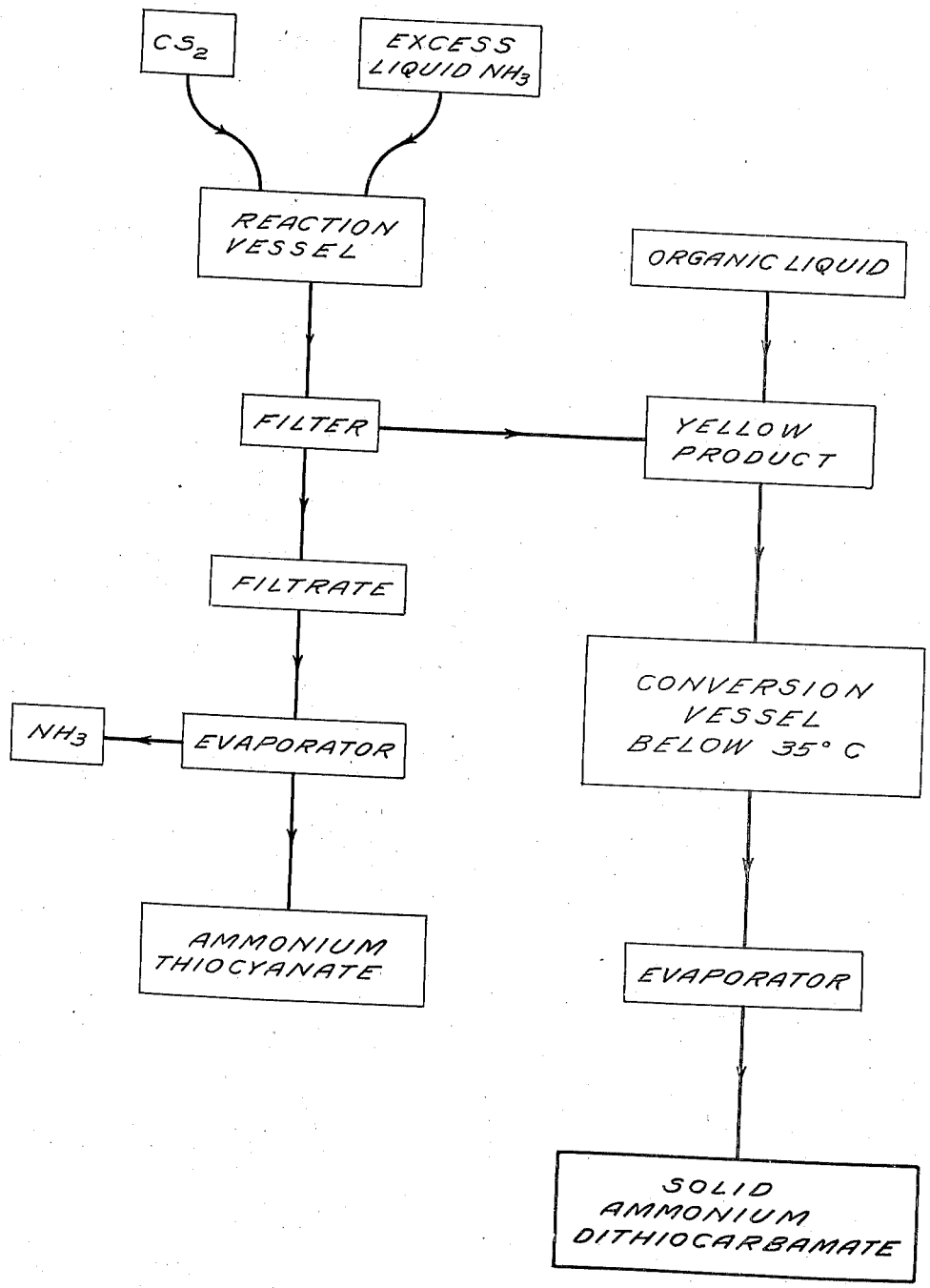
INVENTORS,
WILLIAM H. HILL,
DONOVAN J. SALLEY,
BY Ellis S. Middleton
ATTORNEY.

Patented Mar. 18, 1941

2,235,747

UNITED STATES PATENT OFFICE 2,235,747

PRODUCTION OF AMMONIUM DITHIOCARBAMATE

William H. Hill and Donovan J. Salley, Stamford, Conn., assignors to American Cyanamid Company, New York, N. Y., a corporation of Maine Application August 25, 1939, Serial No. 291,814

3 Claims. (Cl. 260—500)

The present invention relates to the production of ammonium dithiocarbamate through the reaction between carbon bisulfide and liquid ammonia.

The reaction between carbon bisulfide and gaseous ammonia in solvents such as ketones or ethyl alcohol results in the formation of ammonium thiocarbonate, ammonium thiocarbamate and ammonium thiocyanate. Upon introducing the ammonia gas into liquid carbon bisulfide, the ammonium thiocarbonate crystals are the first formed, following which crystals of the ammonium dithiocarbamate precipitate. The separation of these two products is not sharp and, hence, each is contaminated by the other. The former is favored by using concentrated solutions with excess ammonia and moderate temperatures of the order of 30 to 40° C., the latter by dilute solutions with excess carbon bisulfide and low temperatures of the order of 0° to 10° C.

Ammonium thiocyanate remains in the solution, larger amounts resulting after long standing.

It has been discovered that when liquid carbon bisulfide is reacted with liquid ammonia at temperatures ranging from −33 to 40° C., various proportions of ammonium dithiocarbamate, ammonium thiocyanate, and an unidentified yellow compound containing S and N in the proportions of 2:3 and having most likely an empirical formula corresponding to $H_9C_2N_3S_2$, are formed. The higher temperatures favor the formation of ammonium thiocyanate, there being no substantial quantities of other compounds except $H_2S$ formed above 40°. The lower temperatures, and particularly those from −33 to −22° C., favor the production of this yellow compound, which is substantially insoluble in liquid ammonia and in ethyl ether.

It has been determined that when this compound is permitted to stand at temperatures below 35° C. in ethyl ether or other organic liquids such as alcohols, esters, ketones, hydrocarbons or the like to prevent sublimation of the solid product yet permitting ready escape of gases, a conversion of the yellow product to ammonium dithiocarbamate occurs with generation of some $H_2S$ and due to the insolubility of the former in the covering liquid, precipitation takes place almost immediately.

For instance, and as indicated in the flow sheet, if liquid carbon bisulfide and more than sufficient liquid ammonia necessary to react therewith, are placed in an open vessel and vigorously agitated to prevent stratification, after one hour a slurry containing voluminous quantities of the yellow product are obtained. This yellow product, after having been filtered and washed with the liquid ammonia, if treated with an organic liquid such as ethyl ether below 35° C., is converted to a white crystalline compound which separates from the liquid as a precipitate. After a sufficient length of time, the yellow compound is completely converted to this white crystalline substance and upon evaporation of the organic liquid, the former is obtained in a dry state.

The white crystalline compound was positively identified as ammonium dithiocarbamate by reason of its following properties:

On standing in air, it sublimes very slowly, leaving a slight residue which responds qualitatively to the test for thiocyanate. In moist air, the compound absorbs moisture and becomes lemon yellow in color. When warmed in air, it fuses and gives off ammonia and hydrogen sulfide, the residue showing the presence of thiocyanate and free sulfur. It is insoluble in ethyl ether, slightly soluble in liquid ammonia and readily soluble in water. In the latter, clear colorless solutions are produced which are neutral or slightly acid to litmus. Lead acetate added to the neutral solution forms a faintly yellow, curdy precipitate. An excess of the solution decolorizes iodine solution while excess of the latter forms a yellow precipitate. Excess ferric chloride solution gives a black precipitate, while this reagent in the presence of excess solution gives a transient black precipitate with decolorization of the ferric chloride. Aqueous solutions acidified with HCl showed the same results as above when reacted with lead acetate and iodine, while with ferric chloride no black precipitate is formed, although the ferric chloride is reduced.

The ammonium dithiocarbamate thus produced analyzes 97% pure.

In an attempt to speed up the conversion of the yellow compound to ammonium dithiocarbamate, 5.2 grams was refluxed with 54.3 grams of ethyl ether for 1½ hours at 35° C. During that time, $H_2S$ and $NH_3$ were evolved, a small amount of a pinkish white solid deposited in the condenser, while the yellow compound completely disappeared. The ether was then evaporated off at room temperature and a residue of only .3 gram was recovered, which was mostly free sulfur, although a qualitative test showed the presence of some thiocyanate. Consequently, the conversion of the yellow product of dithiocarbamate must take place at temperatures lower than 35° C. at atmospheric pressures and these conditions are, therefore, preferred in carrying out our process.

In working with liquid ammonia in place of ammonia gas, as a reactant with carbon bisulfide, certain advantages will be apparent, such as the lack of necessity of using vessels having large volume together with pumps or the like usually required in bubbling a gas through the liquid and conveying the unreacted gas back to a receiver or circulator. The solvent is also eliminated.

While the invention has been described with particular reference to specific embodiments, it is to be understood that it is not to be limited thereto but is to be construed broadly and restricted solely by the scope of the appended claims.

We claim:

1. A method of producing ammonium dithiocarbamate which includes reacting liquid carbon bisulfide with liquid ammonia and converting the yellow product of the reaction to ammonium dithiocarbamate by permitting it to stand in contact with an organic liquid in which it is substantially insoluble, below 35° C.

2. The method of claim 1 in which the organic liquid is ethyl ether.

3. A method of producing ammonium dithiocarbamate which includes reacting liquid carbon bisulfide and liquid ammonia at atmospheric pressures, filtering off the yellow product contained, washing it with liquid ammonia and converting the washed product to dithiocarbamate by permitting it to stand in contact with ethyl ether below 35° C. and then evaporating the excess ether.

WILLIAM H. HILL.
DONOVAN J. SALLEY.